United States Patent Office 2,910,329
Patented Oct. 27, 1959

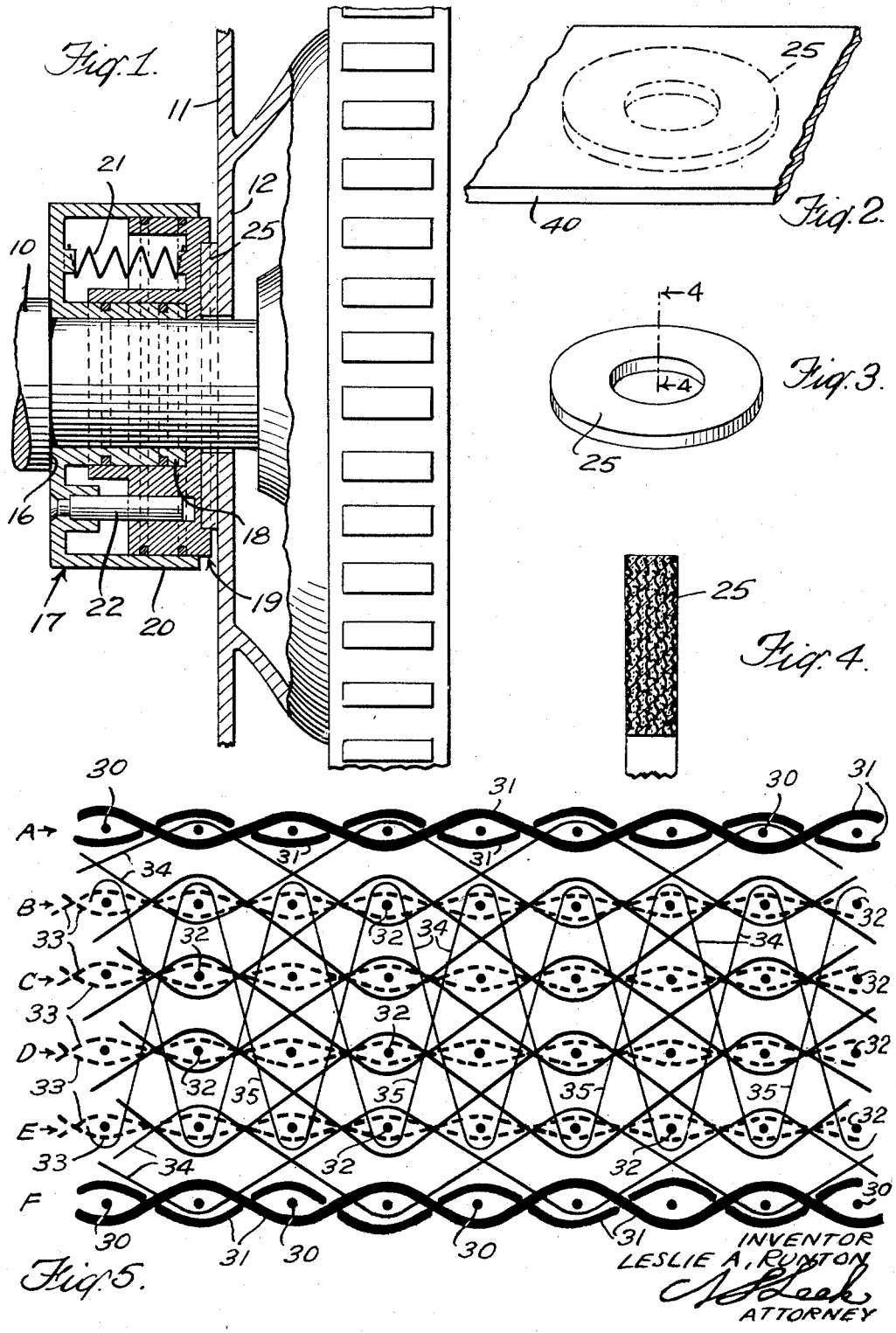

2,910,329
SEALING RING AND THRUST BEARING

Leslie A. Runton, Middle Haddam, Conn., assignor to The Russell Manufacturing Company, Middletown, Conn., a corporation of Connecticut Application January 10, 1958, Serial No. 708,318

2 Claims. (Cl. 308—163)

This invention relates to a thrust bearing and seal of the the molded fabric type and more particularly to a molded fabric bearing disc having anti-friction surface characteristics.

An object is to provide a bearing and sealing disc of the above type having novel and improved characteristics.

In accordance with this invention the bearing or sealing disc is stamped from a sheet of molded fabric composed of a woven multi-ply fabric having a low friction yarn exposed to form the bearing surfaces and having interior plies composed of a yarn which is bondable to a molding resin. The plies are woven together and bound by crossed warp yarns. The fabric is impregnated with a molding resin and molded under heat and pressure to form a flat sheet from which the discs are stamped.

The nature of the invention will be better understood by referring to the following description taken in connection with the accompanying drawing in which a specific embodiment has been given for purposes of illustration.

In the drawing:

Fig. 1 is a broken elevation of a portion of a turbine embodying the invention;

Fig. 2 is a broken perspective of a molded sheet from which the bearing disc is stamped;

Fig. 3 is a perspective view of the bearing disc;

Fig. 4 is a section taken on line 4—4 of Fig. 3 but on a larger scale;

Fig. 5 is a diagram illustrating the weave of the fabric prior to molding.

Referring to the drawing more in detail, a turbine rotor having a shaft 10 is mounted in a housing 11 forming a high pressure chamber having a wall 12 through which shaft 10 extends. The shaft 10 may drive a pump or compressor (not shown). The shaft 10 is shown as having a shoulder 16 against which a cup 17 rests. The cup 17 is provided with a hub 18 which is journalled on the shaft 10. Cap 19 is formed with an annular flange sliding in a wall 20 of cup 17 and pressed outwardly by a series of springs 21, only one of which is shown. Pins 22 peg the cap 19 to the cup 17.

A sealing ring 25 which also serves as a thrust bearing rides on the shaft 10 and is held by the cap 19 in sealing contact with the stationary wall 12 through which the shaft 10 extends.

The construction thus far described is conventional and only so much thereof has been set forth as is necessary to the understanding of the invention.

The sealing ring, in accordance with this invention, is composed of a resin-impregnated, molded fabric having low friction yarn exposed on the contacting surface or surfaces and having intermediate plies composed of a resin bondable yarn.

A fabric of this type is shown in Fig. 5 as comprising six plies A to F. The outer plies A and F are composed of filler yarns 30 and double warp chains 31. The inner plies B to E are composed of filler yarns 32 and double warp chains 33. Adjacent plies are bound together by binder warps 34. Additional binder warps 35 may be used to bind the inner plies B to E together for increased strength.

The warp yarns 31 of the outer plies A and F are composed of a low friction resin of the polymeric fluorocarbon type including tetrafluoroethylene, monochlorotrifluoroethylene resins and Fluorothene. These yarns may be in mono-filament or multi-filament form combined with one or more ends of a material which is capable of bonding to a resin impregnant such as cotton, Dacron, Orlon, rayon or the like. The other yarns may be composed entirely of the latter type of material.

The fabric may be impregnated with a moldable bonding resin and dried but not cured.

For example, the fabric may be impregnated with a high strength phenolic bonding resin derived from the reaction product of phenol, cresol or a homologue with formaldehyde under controlled conditions. The mixture is preheated to remove the solvent and the resin content polymerized until a residual volatile content of 5% to 7% is attained. The impregnated fabric thus dried may be stored for subsequent use or may be shipped to a distant point for molding.

For forming the bearing the fabric is then molded under heat and pressure into the form of a sheet 40 as shown in Fig. 2. The conversion of the resin into a thermoset form may be accomplished at a temperature of 300° F. to 350° F. for from thirty to sixty minutes at pressures of 10 tons to 100 tons, depending upon the area of the object being molded.

Other resin compositions may also be used as the impregnant, for example, polyvinyl chloride or the epoxy resins.

In the case of a liquid, such as polyvinylchloride the mold may be heated to the polymerizing temperature for polyvinylchloride, i.e. 350° F. to 360° F. and immediately cooled to set the resin to solid form with the fabric embedded therein.

The epoxy resins are thermosetting and may be applied to the mold in the form of a molding powder. The mixture is cured by heating to the proper temperature to convert the resin into the form of a solid body in which the fabric is embedded.

In the above construction the low friction yarn is exposed to form the bearing surface and is mechanically bound to other yarns which are capable of bonding to the resin. If the low friction material is in the form of a multifilament yarn twisted with one or more ends of bondable yarn the latter ends bond to the resin and serve to bind the low friction yarns in place. In that case the entire fabric may be composed of this compound yarn, or the compound yarn may be used only on the surface and woven with a backing of bondable yarns as above described.

The disc 25 is stamped out of the sheet 40. This disc 25 has low friction yarns exposed on both surfaces to constitute an anti-friction thrust bearing or seal which can be used for long periods of time without lubrication or excessive wear.

Although a specific use has been illustrated, the disc may be used generally where self-lubricating seals or thrust bearings are required.

What is claimed is:

1. A fabric for making a molded thrust bearing disc, comprising a pair of woven plies and a plurality of woven plies intermediate said pair of plies, said intermediate plies being composed of yarns of a resin bondable material and being bound together by binder yarns extending through said intermediate plies from surface to surface thereof, said outer plies being composed of yarns of a low friction polymeric hydrocarbon composition and each of said outer plies being bound to an intermediate ply by other and separate binder yarns, and a moldable resin in the dried but uncured state impregnating all of the plies of the fabric.

2. A molded fabric thrust bearing comprising a multi-ply fabric embedded in a heat curable thermosetting resin in the hard compacted state characteristic of a resin cured under heat and pressure, said fabric component comprising a pair of outer plies including exposed yarns of polyfluoroethylene which form low friction surfaces and a plurality of intermediate plies composed of yarns of a material bondable by said heat curable thermosetting resin, said intermediate plies being bound together by binder yarns extending through said intermediate plies from surface to surface thereof and each of said outer plies being bound to an intermediate ply by other and separate binder yarns.

References Cited in the file of this patent

UNITED STATES PATENTS

| | | |
|---|---|---|
| 2,804,886 | White | Sept. 3, 1957 |
| 2,805,903 | Warren | Sept. 10, 1957 |
| 2,862,283 | Rasero | Dec. 2, 1958 |